US012617955B2

(12) United States Patent
Achten et al.

(10) Patent No.: US 12,617,955 B2
(45) Date of Patent: May 5, 2026

(54) ADDITIVE PRODUCTION PROCESS WITH A THERMOPLASTIC RADICALLY CROSS-LINKABLE CONSTRUCTION MATERIAL

(71) Applicant: Stratasys, Inc., Eden Prairie, MN (US)

(72) Inventors: Dirk Achten, Leverkusen (DE); Thomas Buesgen, Leverkusen (DE); Christoph Tomczyk, Leverkusen (DE); Michael Ludewig, Odenthal (DE); Thomas Faecke, Leverkusen (DE); Roland Wagner, Leverkusen (DE); Florian Stempfle, Cologne (DE)

(73) Assignee: Stratasys, Inc., Minnetonka, MN (US)

( * ) Notice: Subject to any disclaimer, the term of this patent is extended or adjusted under 35 U.S.C. 154(b) by 949 days.

(21) Appl. No.: 16/621,761

(22) PCT Filed: Jun. 29, 2018

(86) PCT No.: PCT/EP2018/067557
§ 371 (c)(1),
(2) Date: Dec. 12, 2019

(87) PCT Pub. No.: WO2019/002540
PCT Pub. Date: Jan. 3, 2019

(65) Prior Publication Data

US 2020/0140707 A1 May 7, 2020

(30) Foreign Application Priority Data

Jun. 30, 2017 (EP) .................................... 17179206

(51) Int. Cl.
*B33Y 30/00* (2015.01)
*B29C 64/124* (2017.01)
(Continued)

(52) U.S. Cl.
CPC .......... *C09D 11/102* (2013.01); *B29C 64/124* (2017.08); *B33Y 10/00* (2014.12);
(Continued)

(58) Field of Classification Search
None
See application file for complete search history.

(56) References Cited

U.S. PATENT DOCUMENTS

2001/0025061 A1 9/2001 Wu et al.
2005/0209361 A1* 9/2005 Detrembleur ........ C09D 175/16 522/183

(Continued)

FOREIGN PATENT DOCUMENTS

GB 899948 * 10/1960
WO 2011091196 A1 7/2011

(Continued)

OTHER PUBLICATIONS

Applied Plastics Engineering Handbook, Table 5.4. Glass Transition and Crystal Melting Temperatures. Retrieved from https://app.knovel.com/hotlink/itble/rcid:kpAPEHPMA5/id:kt00XRE1A6/applied-plastics-engineering/table-5-4-glass-transition (Year: 2017).*

(Continued)

*Primary Examiner* — Susan D Leong
*Assistant Examiner* — Tiffany Yu Huang
(74) *Attorney, Agent, or Firm* — Faegre Drinker Biddle & Reath LLP

(57) ABSTRACT

The present invention relates to a method for producing an object in an additive manufacturing process from a precursor and comprises the following steps: I) depositing a layer of a radically cross-linkable construction material, which corresponds to a first selected cross-section of the precursor, on a carrier; II) depositing a layer of a radically cross-linkable construction material, which corresponds to a further
(Continued)

selected cross-section of the precursor, on a previously applied layer of the radically cross-linked construction material; III) repeating step II) until the precursor is formed. The radically cross-linkable construction material comprises a thermoplastic radically cross-linkable polyurethane with a urethane group content of ≥5% by weight and a photoinitiator. The radically cross-linkable construction material is also heated to a processing temperature that is greater than the melting point of the radically cross-linkable polyurethane. After step III) the precursor having a temperature of 20° C. is defined as the object, or step IV) is performed: IV) performing a chemical reaction in the precursor obtained after step III) so that the object is obtained.

11 Claims, 1 Drawing Sheet

(51) Int. Cl.

| | |
|---|---|
| ***B33Y 10/00*** | (2015.01) |
| ***B33Y 70/00*** | (2020.01) |
| ***C09D 11/101*** | (2014.01) |
| ***C09D 11/102*** | (2014.01) |
| *B29K 75/00* | (2006.01) |
| *B33Y 70/10* | (2020.01) |

(52) U.S. Cl.

CPC ............... *B33Y 30/00* (2014.12); *B33Y 70/00* (2014.12); *C09D 11/101* (2013.01); *B29K 2075/00* (2013.01); *B33Y 70/10* (2020.01)

(56) References Cited

U.S. PATENT DOCUMENTS

| | | | | |
|---|---|---|---|---|
| 2012/0220717 | A1 | 8/2012 | Richter et al. | |
| 2016/0136889 | A1* | 5/2016 | Rolland ........... | B29D 11/00663 264/1.27 |
| 2018/0148585 | A1* | 5/2018 | Eckel ................ | C04B 35/62873 |

FOREIGN PATENT DOCUMENTS

| | | | |
|---|---|---|---|
| WO | 2012004088 | A1 | 1/2012 |
| WO | 2015200189 | A1 | 12/2015 |
| WO | 2016039986 | A1 | 3/2016 |
| WO | 2016181149 | A1 | 11/2016 |
| WO | 2016181402 | A1 | 11/2016 |
| WO | 2017112653 | A1 | 6/2017 |

OTHER PUBLICATIONS

Chernov, Oleg V. et al., Heteroleptic tin (II) dialkoxides stabilized by intramolecular coordination Sn (OCH2CH2NMe2)(OR) (R=Me, Et, iPr, tBu, Ph). Synthesis, structure and catalytic activity in polyurethane synthesis. Journal of Organometallic Chemistry, 694, (2009) pp. 3184-3189.

Selina, A.A. et al., Metallocanes of Group 14 Elements, Chemistry of Heterocyclic Compounds, vol. 43, No. 7, 2007, pp. 813-834.

Mehrotra, R.C. & Gupta, V.D., Ethanolamine Derivatives of Sn(IV), Indian J. Chem., 1967, 5, pp. 643-645.

International Search Report, PCT/EP2018/067557, date of mailing: Sep. 26, 2018, Authorized officer. Markus Eigner.

* cited by examiner

ADDITIVE PRODUCTION PROCESS WITH A THERMOPLASTIC RADICALLY CROSS-LINKABLE CONSTRUCTION MATERIAL

CROSS-REFERENCE TO RELATED APPLICATION

This application is a national stage application under 35 U.S.C. § 371 of PCT/EP2018/067557, filed Jun. 29, 2018, which claims the benefit of European Application No. 17179206.2, filed Jun. 30, 2017, each of which is incorporated herein by reference.

BACKGROUND

Coating compositions which cure by two independent processes are generally referred to as dual-cure systems. The binder components present generally have different functional groups which under suitable conditions generally undergo crosslinking with one another independently of one another. Customary prior art dual-cure systems have radiation-curable and thermally curable groups, wherein particularly advantageous properties are obtained when using isocyanate and hydroxyl groups as thermally crosslinking functions. However the disadvantage of such solutions is that the reactivity of the NCO groups and/or the presence of catalysts for the second curing mechanism limits the pot life of the coating composition.

One class of dual-cure systems contains blocked isocyanates. After a deblocking at a suitable temperature, the NCO groups are available for reactions with polyols. Disadvantages of the use of blocked isocyanates are the typically high viscosity for blocked isocyanates and the typically very high deblocking temperature.

In coating applications and for use as adhesives, dual-cure systems can have advantages in so-called shadow curing. This is to be understood as meaning a curing mechanism which proceeds not photochemically but rather, for example, thermally. The coating or adhesive composition can then undergo further curing even in the case of substrates having complex shapes with regions that are shaded with respect to an exposure lamp.

Several main groups of dual-cure technology are in existence in the coatings and adhesives sectors: two different free-radical starters (UV and thermal), UV and moisture post-curing, UV and PUR-2K curing and cationically catalyzed UV and thermal curing. For example Berlac AG markets a dual-cure lacquer system under the name Berlac 082.907 in which a reaction between NCO groups and OH groups is triggered first before the system is subjected to UV curing.

A further conceivable application of dual-cure systems is in additive manufacturing methods ("3D printing"). Additive manufacturing methods refer to those methods by which articles are built up layer by layer. They therefore differ markedly from other methods of producing articles such as milling or drilling. In the latter methods, an article is processed such that it takes on its final geometry via removal of material.

Additive manufacturing methods use different materials and processing techniques to build up articles layer by layer. One group of additive manufacturing methods uses free-radically crosslinkable resins which in some cases obtain their final strength in the formed article via a second curing mechanism. Examples of such methods are stereolithography methods and the so-called DLP method derived therefrom.

For 3D printing, the disadvantages of conventional dual-cure systems in respect of pot life mean that an unused build material is difficult to reuse and the planned build times for a product cannot exceed the pot life.

What would therefore be desirable would be 3D printing methods in which the disadvantages mentioned do not occur.

WO 2016/181402 A1 discloses a method of producing a polymeric three-dimensional object by printing a photopolymerizable material in the melt to give an object having a memorizable first form which is deformable to a metastable form and which can transform to the first form above a trigger temperature of the polymer. In an experiment described, a polycaprolactone is reacted with isocyanatoethyl methacrylate and the resulting macromonomer is processed at 90° C. as a melt in a 3D printer using UV light (385 nm) to form an article.

Further prior art documents are WO 2016/181149 A1 ("Method for making an object"), WO 2015/200189 A1 ("Three-dimensional objects produced from materials having multiple mechanisms of hardening"), WO 2016/039986 A1 ("Build materials having a metallic appearance for 3D printing") and US 2001/0025061 A1 ("Thermally-stable photopolymer composition and light transmissive device").

SUMMARY

It is an object of the present invention to at least partly overcome at least one disadvantage of the prior art. It is a further object of the invention to provide an additive manufacturing method in which the articles to be produced from a build material with more than one mechanism for increasing mechanical strength are obtainable in a very cost-efficient and/or individualized and/or resource-efficient manner, especially in terms of the reusability of build material.

The object is achieved in accordance with the invention by a method as claimed in claim 1. Advantageous developments are specified in the subsidiary claims. They may be combined as desired, unless the opposite is unambiguously apparent from the context.

BRIEF DESCRIPTION OF THE DRAWINGS

Various features and characteristics of the inventions described in this specification may be better understood by reference to the accompanying figures, in which.

DETAILED DESCRIPTION

Figure 1:
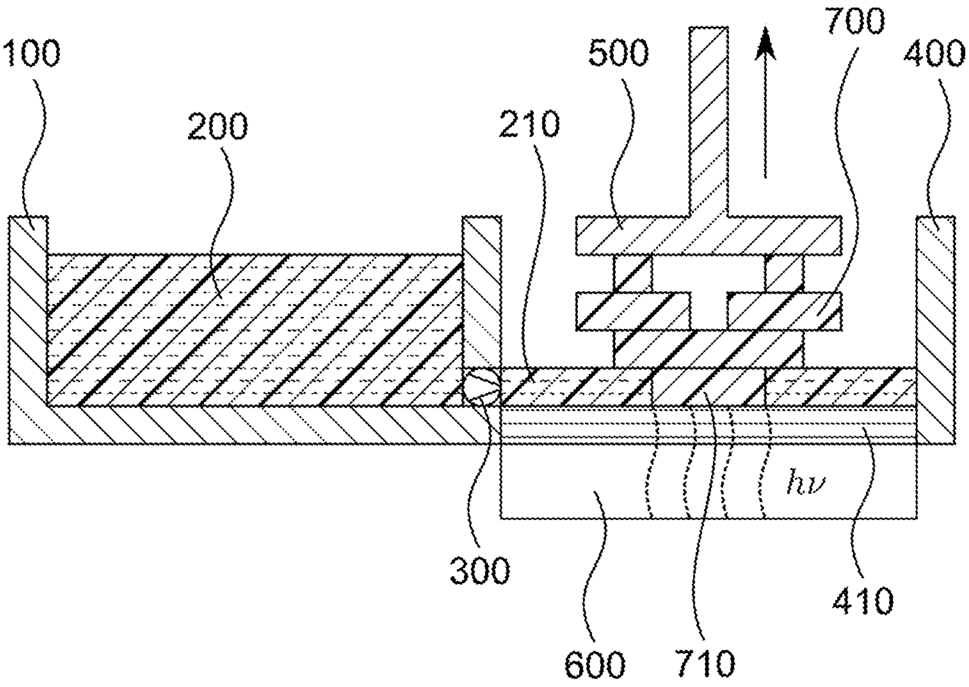
FIG. 1 depicts a system of the invention in the performance of the method of the invention.

A method of producing an article in an additive manufacturing method from a precursor comprises the steps of:

I) depositing a layer of a free-radically crosslinked build material corresponding to a first selected cross section of the precursor on a carrier;

II) depositing a layer of a free-radically crosslinked build material corresponding to a further selected cross section of the precursor onto a previously applied layer of the free-radically crosslinked build material;

III) repeating step II) until the precursor is formed;

wherein the depositing of a free-radically crosslinked build material at least in step II) is effected by exposure and/or irradiation of a selected region of a free-radically crosslinkable build material corresponding to the respectively selected cross section of the precursor;

wherein the carrier is disposed within a container, the container provides the free-radically crosslinkable build material, the carrier can be raised vertically counter to the direction of gravity and the carrier is additionally raised by a predetermined distance prior to each step II), such that a layer of the free-radically crosslinkable build material forms below the lowermost layer of the build material as viewed in vertical direction.

The free-radically crosslinkable build material comprises a thermoplastic free-radically crosslinkable polyurethane having a urethane group content of ≥5% by weight and a photoinitiator and is heated in step II) to a processing temperature greater than the melting point of the free-radically crosslinkable polyurethane.

After step III), the precursor having a temperature of 20° C. is defined as the article or, after step III), step IV) is conducted:

IV) performing a chemical reaction in the precursor obtained after step III), such that the article is obtained.

In the method of the invention, the article is thus obtained in at least two production phases. The first production phase can be regarded as the build phase. This build phase can be implemented by means of ray optics-based additive manufacturing methods such as the DLP (digital light processing) method and is represented by steps I), II) and III). The second production phase can be regarded as the curing phase. Here, the precursor or intermediate article obtained after the build phase is converted to a more mechanically durable article without any further change in the shape thereof. In the context of the present invention, the material from which the precursor is obtained in the additive manufacturing method is referred to generally as "build material".

Step I) of the method comprises depositing a free-radically crosslinked build material on a carrier. This is usually the first step in DLP methods. In this way, a layer of a build material bonded to the carrier which corresponds to a first selected cross section of the precursor is obtained.

As per the instruction of step III), step II) is repeated until the desired precursor is formed. Step II) comprises depositing a free-radically crosslinked build material on a previously applied layer of the build material to obtain a further layer of the build material which corresponds to a further selected cross section of the precursor and which is joined to the previously applied layer. The previously applied layer of the build material may be the first layer from step I) or a layer from a previous run of step II).

What is envisaged in accordance with the invention is that the depositing of a free-radically crosslinked build material at least in step II) (preferably also in step I) is effected by exposure and/or irradiation of a selected region of a free-radically crosslinkable build material corresponding to the respectively selected cross section of the article. The terms "free-radically crosslinkable build material" and "free-radically crosslinked build material" are used in the context of the present invention. The free-radically crosslinkable build material is converted to the free-radically crosslinked build material by the exposure and/or irradiation which triggers free-radical crosslinking reactions. "Exposure" is to be understood in the present context as meaning the action of light in the range between near-IR and near-UV light (wavelengths of 1400 nm to 315 nm). The remaining shorter wavelength ranges are covered by the term "irradiation", for example far UV light, x-ray radiation, gamma radiation and also electron radiation.

The respective cross section is appropriately selected by a CAD program with which a model of the article to be produced has been created. This operation is also known as "slicing" and serves as a basis for controlling the exposure and/or irradiation of the free-radically crosslinkable build material.

In the method, the free-radically crosslinkable build material comprises a thermoplastic free-radically crosslinkable polyurethane having a urethane group content of ≥5% by weight and a photoinitiator. The urethane group content can be calculated in a known manner with knowledge of the NCO content and the OH number of the reactants used for preparation of the polyurethane. The urethane group content is preferably ≥5% by weight to ≤50% by weight, based on the total weight of the polyurethane. It is more preferably ≥10% by weight to ≤40% by weight, especially preferably ≥15% by weight to ≤30% by weight.

The free-radically crosslinkable polyurethane can be obtained, for example, from the reaction of an NCO-terminated polyurethane with a hydroxyalkyl (meth)acrylate. Another approach is the reaction of an OH-terminated polyurethane with NCO-terminated (meth)acrylates such as isocyanatoethyl (meth)acrylate.

Suitable diisocyanates for preparation of the polyurethanes are, for example, those having a molecular weight in the range from 140 to 400 g/mol and having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane ($H_{12}$MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-methane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates.

Examples of suitable polyols are preferably linear polyether polyols, polyester polyols, polyacrylate polyols, polyepoxide polyols or polycarbonate polyols. In addition, it is also possible in accordance with the invention to use prepolymers, for example polyether prepolymers, polyester prepolymers, polyacrylate prepolymers, polyepoxide prepolymers or polycarbonate prepolymers, as reactants for polyurethane formation.

Suitable hydroxyalkyl (meth)acrylates include alkoxyalkyl (meth)acrylates having 2 to 12 carbon atoms in the hydroxyalkyl radical. Preference is given to 2-hydroxyethyl acrylate, the mixture of isomers resulting from the addition of propylene oxide onto acrylic acid, or 4-hydroxybutyl acrylate, and the analogous methacrylates.

In the method, the free-radically crosslinkable build material is heated in step II) to a processing temperature greater than the melting point of the free-radically crosslinkable polyurethane. The melting point is appropriately determined by DSC (differential scanning calorimetry). The temperature may be ≥2° C. to ≤100° C., preferably ≥5° C. to ≤80° C. and more preferably ≥10° C. to ≤60° C. above the melting point of the free-radically crosslinkable polyurethane ascertained by DSC.

Preferably, the processing temperature of the build material is above room temperature (RT) of 23° C. Preferably, the processing temperature of the build material is at least 5° C., or preferably at least 10° C., or preferably at least 25° C., or preferably at least 50° C., above room temperature (RT) of 23° C.

It is possible and advantageous when the method of the invention is conducted in such a way that at least some of the layers of the free-radically crosslinked build material deposited in steps II) conducted beforehand are kept at a temperature above the melting point thereof, where the material has been crosslinked in the melt, i.e. the gel point has been exceeded. This may be, for example, the last 100, preferably the last 50 or more preferably the last 15 layers. The gel point is considered to have been reached when, in a dynamic-mechanical analysis (DMA) with a plate/plate oscillation viscometer in accordance with ISO 6721-10 at 20° C., the graphs of the storage modulus G' and the loss modulus G" intersect. In this procedure, mechanical stresses resulting from cooling and crystallizing during the 3D printing operation can be reduced or entirely avoided, and, at the same time, better adhesion of the layer just deposited to the layer deposited beforehand in each case can be achieved.

This particular embodiment is preferable because, in this way, the precursor is converted largely without stress to the product and, at the same time, the lower layers form good adhesion to the next build layer in each case.

After step III), the method of the invention offers two alternatives. Either no further chemical reaction is conducted in the precursor obtained or just such a chemical reaction is conducted. In the first variant, the precursor, once it has assumed a temperature of 20° C. (for example by removal from the 3D printer and cooling), is defined as the article to be obtained. The article has elevated mechanical strength compared to the precursor and the production method with regard to said article has ended. In the second variant, step III) is followed by step IV) in which the precursor or its free-radically crosslinked build material a chemical reaction is conducted. This reaction may, for example, be thermally initiated. In this way too, the article gains elevated mechanical strength compared to the precursor.

It is possible that, for example, owing to the temperature control of the 3D printer or gradual crystallization of the free-radically crosslinked build material in the precursor obtained after step III), the material remains in the state of a crosslinked polymer melt until the precursor is removed from the apparatus used for production thereof.

It is preferable that step IV) is performed when the entirety of the deposited build material of the precursor has reached its gel point. The gel point is considered to have been reached when, in a dynamic-mechanical analysis (DMA) with a plate/plate oscillation viscometer in accordance with ISO 6721-10 at 20° C., the graphs of the storage modulus G' and the loss modulus G" intersect. The free-radically crosslinked build material may have a storage modulus G' (DMA, plate/plate oscillation viscometer according to ISO 6721-10 at 20° C. and a shear rate of l/s) of ≥$10^6$ Pa.

The free-radically crosslinkable build material may further comprise additives such as fillers, UV-stabilizers, free-radical inhibitors, antioxidants, mold release agents, water scavengers, slip additives, defoamers, flow agents, rheology additives, flame retardants and/or pigments. These auxiliaries and additives, excluding fillers and flame retardants, are typically present in an amount of less than 10% by weight, preferably less than 5% by weight, more preferably up to 3% by weight, based on the free-radically crosslinkable build material. Flame retardants are typically present in amounts of not more than 70% by weight, preferably not more than 50% by weight, more preferably not more than 30% by weight, calculated as the total amount of employed flame retardants based on the total weight of the free-radically crosslinkable build material.

Suitable fillers are, for example, $SiO_2$, $AlOH_3$, $Al_2O_3$, $CaCO_3$, metal pigments such as $TiO_2$ and other known customary fillers. These fillers are preferably used in amounts of not more than 70% by weight, preferably not more than 50% by weight, more preferably not more than 30% by weight, calculated as the total amount of fillers used, based on the total weight of the free-radically crosslinkable build material.

In a particular embodiment, the fillers are at least partly fibrous in nature with an aspect ratio of >10 to <5000. Preferred fiber lengths are >5 micrometers to <100 micrometers; preferred fiber densities are >0.9 g/$cm^3$ to <2 g/$cm^3$, more preferably >0.95 g/$cm^3$ to <1.6 g/$cm^3$. Illustrative fibers are carbon fibers, PE fibers, polyamide fibers, polyimide fibers, polyester fibers, cotton fibers, rayon fibers, flax fibers, jute fibers, polyurethane fibers. Particular preference is given to polyurethane fibers and PE fibers.

Suitable UV stabilizers may preferably be selected from the group consisting of piperidine derivatives, for example 4-benzoyloxy-2,2,6,6-tetramethylpiperidine, 4-benzoyloxy-1,2,2,6,6-pentamethylpiperidine, bis(2,2,6,6-tetramethyl-4-piperidyl) sebacate, bis(1,2,2,6,6-pentamethyl-1-4-piperidinyl) sebacate, bis(2,2,6,6-tetramethyl-4-piperidyl) suberate, bis(2,2,6,6-tetramethyl-4-piperidyl) dodecanedioate; benzophenone derivatives, for example 2,4-dihydroxy-, 2-hydroxy-4-methoxy-, 2-hydroxy-4-octoxy-, 2-hydroxy-4-dodecyloxy- or 2,2'-dihydroxy-4-dodecyloxybenzophenone; benzotriazole derivatives, for example 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4,6-bis (1-methyl-1-phenylethyl)phenol, 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol, 2-(2H-benzotriazol-2-yl)-6-(1-methyl-1-phenylethyl)-4-(1,1,3,3-tetramethylbutyl)phenol, isooctyl 3-(3-(2H-benzotriazol-2-yl)-5-(1,1-dimethylethyl)-4-hydroxyphenylpropionate), 2-(2H-benzotriazol-2-yl)-4,6-bis(1,1-dimethylethyl)phenol, 2-(2H-benzotriazol-2-yl)-4,6-bis(1-methyl-1-phenylethyl)phenol, 2-(5-chloro-2H-benzotriazol-2-yl)-4,6-bis(1,1-dimethylethyl)phenol; oxalanilides, for example 2-ethyl-2'-ethoxy- or 4-methyl-4'-methoxyoxalanilide; salicylic esters, for example phenyl salicylate, 4-tert-butylphenyl salicylate, 4-tert-octylphenyl salicylate; cinnamic ester derivatives, for example methyl α-cyano-β-methyl-4-methoxycinnamate, butyl α-cyano-β-methyl-4-methoxycinnamate, ethyl α-cyano-β-phenylcinnamate, isooctyl α-cyano-β-phenylcinnamate; and malonic ester derivatives, such as dimethyl 4-methoxybenzylidenemalonate, diethyl 4-methoxybenzylidenemalonate, dimethyl 4-butoxybenzylidenemalonate. These preferred light stabilizers may be used either individually or in any desired combinations with one another.

Particularly preferred UV stabilizers are those which completely absorb radiation having a wavelength <400 nm. These include the recited benzotriazole derivatives for example. Very particularly preferred UV stabilizers are 2-(5-chloro-2H-benzotriazol-2-yl)-6-(1,1-dimethylethyl)-4-methylphenol, 2-(2H-benzotriazol-2-yl)-4-(1,1,3,3-tetramethylbutyl)phenol and/or 2-(5-chloro-2H-benzotriazol-2-yl)-4,6-bis(1,1-dimethylethyl)phenol.

One or more of the UV stabilizers recited by way of example are optionally added to the free-radically crosslinkable build material preferably in amounts of 0.001% to 3.0% by weight, more preferably 0.005% to 2% by weight, calculated as the total amount of UV stabilizers used, based on the total weight of the free-radically crosslinkable build material.

Suitable antioxidants are preferably sterically hindered phenols which may be selected preferably from the group consisting of 2,6-di-tert-butyl-4-methylphenol (ionol), pentaerythritol tetrakis(3-(3,5-di-tert-butyl-4-hydroxyphenyl) propionate), octadecyl 3-(3,5-di-tert-butyl-4-hydroxyphenyl)propionate, triethylene glycol bis(3-tert-butyl-4-hydroxy-5-methylphenyl)propionate, 2,2'-thiobis(4-methyl-6-tert-butylphenol) and 2,2'-thiodiethyl bis[3-(3,5-di-tert-butyl-4-hydroxyphenyl)propionate]. These may be used either individually or in any desired combinations with one another as required. These antioxidants are preferably used in amounts of 0.01% to 3.0% by weight, particularly preferably 0.02% to 2.0% by weight, calculated as the total amount of antioxidants used, based on the total weight of the free-radically crosslinkable build material.

Suitable free-radical inhibitors/retarders are particularly those which specifically inhibit uncontrolled free-radical polymerization of the formulation outside the desired (irradiated) range. These are crucial for good contour sharpness and imaging accuracy in the precursor. Suitable free-radical inhibitors must be chosen according to the desired free-radical yield from the irradiation/exposure step and the polymerization rate and reactivity/selectivity of the double bond carrier. Suitable free-radical inhibitors are, for example, 2,2-(2,5-thiophenediyl)bis(5-tert-butylbenzoxazole), phenothiazine, hydroquinones, hydroquinone ether, quinone alkyds and nitroxyl compounds and mixtures thereof, benzoquinones, copper salts, catechols, cresols, nitrobenzene and oxygen. These antioxidants are preferably used in amounts of 0.001% by weight to 3% by weight, based on the total weight of the free-radically crosslinkable build material.

Embodiments and further aspects of the present invention are elucidated hereinbelow. These may be combined with one another as desired unless the opposite is apparent from the context.

Preferably, the free-radically crosslinkable polyurethane has a melting point or glass transition point of ≥25° C., or preferably ≥30° C., or preferably ≥35° C. to ≤150° C., more preferably ≥40° C. to ≤120° C. (determined by DSC).

The free-radically crosslinkable polyurethane at RT preferably has a viscosity (DIN EN ISO 2884-1) of ≥10 000 mPas, or preferably ≥20 000 mPas, or preferably ≥25 000 mPas, or is a solid.

In a preferred embodiment, the free-radically crosslinkable polyurethane has a melting point or glass transition point (of ≥50° C. (DSC; preferably ≥60° C. to ≤150° C., more preferably ≥80° C. to ≤120° C.); the free-radically crosslinkable polyurethane has a viscosity (DIN EN ISO 2884-1) at the processing temperature of ≤10 000 mPas (preferably ≥50 mPas to ≤8000 mPas, more preferably ≥500 mPas to ≤5000 mPas); and/or the photoinitiator has a half-life for its thermal degradation at the processing temperature of ≥1 hour, or preferably ≥1.5 hours to ≤5 hours, more preferably ≥2 hours to ≤4 hours.

The build material has a pot life at the processing temperature in the presence of the photoinitiator of preferably ≥1 hour, or preferably ≥1.5 hours to ≤5 hours, more preferably ≥2 hours to ≤4 hours. Pot life is understood in the context of the invention to mean the time within which the viscosity of the build resin doubles.

In a further preferred embodiment, in addition to photoinitiators, thermally activatable free-radical donors are also present, for example peroxides, which preferably cause unreacted double bonds to react in a heat treatment process performed in step IV) at temperatures above the recommended decomposition temperatures for these free-radical donors.

In a further preferred embodiment, there are further functional groups in blocked or unblocked form other than free-radically crosslinkable functional groups in the free-radically crosslinkable build material, and these are capable of entering into a reaction other than free-radical crosslinking for increasing mechanical strength in the build material. In the context of the present invention, a reaction for increasing mechanical strength is understood to mean not only a crosslinking reaction but also any other reaction that increases the modulus of elasticity (DIN 53504) of the article obtained by the method of the invention at 20° C. by ≥10% (preferably ≥20%, more preferably ≥50%). An alternative or additional criterion used for this purpose may be an increase in tensile strength (DIN 53504) of the article obtained by the method of the invention at 20° C. by ≥10% (preferably ≥20%, more preferably ≥50%). Examples of such reactions are addition and condensation reactions. As well as the free-radically induced crosslinking and the cooling, mechanical strengthening of the article thus takes place in a third way after these reactions have run.

In a further preferred embodiment, the free-radically crosslinkable build material contains a polyamine component. In a heated build material, it is thus possible for a chemical reaction to take place in the build material (if appropriate in the presence of urethanization catalysts and/or transesterification catalysts). The urethane groups formed by addition may open reversibly, at least in part, under these conditions, as a result of which free NCO groups are available for reaction with the amino groups of the polyamine component to form urea groups. In this way, the average molecular weight of the polyurethane can be increased. In the case of polyamines with an average functionality of >2, the crosslinking density in the build material can be increased further. When the polyurethane has been formed at least partly from polyester polyols, a further reaction that can also proceed is the opening of the ester bonds and reaction with polyamines to give amides. In this way too, it is preferably possible to achieve further curing of the build material after the precursor has been obtained. The same is true when the build material comprises a polyester polymer.

Catalysts usable in accordance with the invention are those that accelerate the urethanization reaction and also the reverse reaction to give isocyanates and polyols and/or amidation of the urethane bond to give ureas, and/or those that accelerate amidation of ester groups to give amides. Suitable catalysts for the purpose are known to those skilled in the art and may be effective under basic, acidic or neutral pH conditions. In a preferred variant, the transamidation reaction is conducted without the addition of additional catalysts.

Suitable amines for the polyamine component are especially aliphatic polyamines having an average amine functionality of ≥2, preferably symmetric aliphatic polyamines having an average amine functionality of ≥2 (linear or alicyclic polyamines having fixed geometries with respect to their cis or trans configurations).

In a further preferred embodiment, the polyamine component has an average number of Zerewitinoff-active hydrogen atoms of ≥4.

In a further preferred embodiment, the polyamine component contains one or more compounds from the group of: adipic dihydrazide, ethylenediamine, diethylenetriamine, triethylenetetramine, tetraethylenepentamine, pentaethylenehexamine, dipropylenetriamine, hexamethylenediamine, hydrazine, isophoronediamine, (4,4'- and/or 2,4'-)diaminodicyclohexylmethane, (4,4'- and/or 2,4'-)diamino-3,3'-dimethyldicyclohexylmethane and N-(2-aminoethyl)-2-aminoethanol.

In a further preferred embodiment, the polyamine component is present in a proportion of ≥0.1% by weight to ≤25% by weight, based on the weight of the build material.

In a further preferred embodiment, the free-radically crosslinkable build material contains blocked or unblocked NCO groups. When the NCO groups are blocked, the method of the invention also includes the step of deblocking these NCO groups. After they have been deblocked, they are available for further reactions.

The blocking agent is chosen such that the NCO groups are at least partly deblocked when heated in the method of the invention. Examples of blocking agents are alcohols, lactams, oximes, malonic esters, alkyl acetoacetates, triazoles, phenols, imidazoles, pyrazoles and amines, for example butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-methyl-, N-ethyl-, N-(iso)propyl, N-n-butyl-, N-isobutyl-, N-tert-butylbenzylamine or 1,1-dimethylbenzylamine, N-alkyl-N-1,1-dimethylmethylphenylamine, adducts of benzylamine onto compounds having activated double bonds such as malonic esters, N,N-dimethylaminopropylbenzylamine and other optionally substituted benzylamines containing tertiary amino groups and/or dibenzylamine, or any desired mixtures of these blocking agents.

In a further preferred embodiment, the free-radically crosslinkable build material contains an isocyanate trimerization catalyst. The trimerization catalyst is preferably potassium acetate, potassium acetate in combination with a crown ether, potassium acetate in combination with a polyethylene glycol, potassium acetate in combination with a polypropylene glycol, tin octoate, sodium phenoxide, potassium hydroxide, trioctylphosphine, tributyltin oxide or a mixture of at least two of the aforementioned catalysts. The reaction for increasing mechanical strength is thus the formation of isocyanurates from free NCO groups. This results in further crosslinking of the build material.

In a further preferred embodiment, the free-radically crosslinkable build material contains groups having Zerewitinoff-active hydrogen atoms and one or more cyclic tin compounds of the formula F-I, F-II and/or F-III:

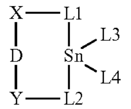

(F-I)

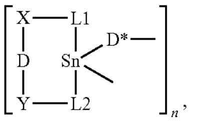

with n > 1

(F-II)

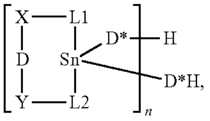

with n > 1

(F-III)

wherein:

D is —O—, —S— or —N(R1)- where R1 is a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen or the radical

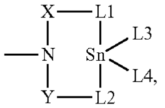

or R1 and L3 together are —Z-L5-;

D* is —O— or —S—;

X, Y and Z are identical or different radicals selected from alkylene radicals of formulae —C(R2)(R3)-, —C(R2)(R3)-C(R4)(R5)- or —C(R2)(R3)-C(R4)(R5)-C(R6)(R7)- or ortho-arylene radicals of formulae

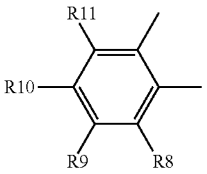

or

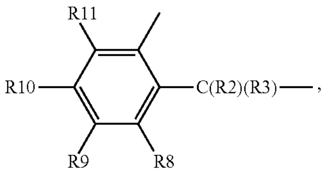

where R2 to R11 are independently saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen;

L1, L2 and L5 are independently —O—, —S—, —OC(=O)—, —OC(=S)—, —SC(=O)—, —SC(=S)—, —OS(=O)$_2$O—, —OS(=O)$_2$— or —N(R12)-, where R12 is a saturated or unsaturated, linear or branched, aliphatic or cycloaliphatic radical or an optionally substituted aromatic or araliphatic radical which has up to 20 carbon atoms and may optionally contain heteroatoms from the group of oxygen, sulfur, nitrogen, or is hydrogen;

L3 and L4 are independently —OH, —SH, —OR13, -Hal, —OC(=O)R14, —SR15, —OC(=S)R16, —OS(=O)$_2$OR17, —OS(=O)$_2$R18 or —NR19R20, or L3 and L4 together represent -L1-X-D-Y-L2-, where R13 to R20 are independently saturated or unsaturated, linear or branched, aliphatic or cycloaliphatic or optionally substituted aromatic or araliphatic radicals which have up to 20 carbon atoms and may optionally contain heteroatoms from the group of oxygen, sulfur, nitrogen, or are hydrogen.

The tin compounds of the formulae F-I, F-II and F-III are thermally labile. Below a certain temperature, they do not exhibit industrially useful catalytic activity for the reaction of NCO groups with functional groups bearing Zerewitinoff-active hydrogen atoms. The reactions in question here are especially urethanizations and urea formations. Above a certain temperature, however, there is a significant rise in catalytic activity. Without being limited to a theory, it is assumed that then the ligands completely or partially dissociate Sn center and therefore the Sn center is available as a catalyst. The catalysts may therefore be referred to as thermally latent catalysts. Because the NCO groups present in the build material do not react below this temperature, the build material is also easy to reuse.

In the cases in which the tin compounds of the formulae F-I, F-II and/or F-III have ligands with free OH radicals and/or NH radicals, the catalyst can be incorporated into the product in the polyisocyanate polyaddition reaction. A particular advantage of these incorporable catalysts is their markedly reduced fogging behavior.

The different methods of preparation for the tin(IV) compounds for use in accordance with the invention or their tin(II) precursors are described inter alia in: *J. Organomet. Chem.* 2009 694 3184-3189, *Chem. Heterocycl. Comp.* 2007 43 813-834, *Indian J. Chem.* 1967 5 643-645 and in literature cited therein.

The content of the tin compounds of the formulae F-I, F-II and/or F-III in the build material may be made dependent on the type of isocyanates on which the build material is based. For instance, when NCO groups bonded to an aromatic carbon atom are dominant, the content may be ≤100 ppm, based on the total weight of the build material. When NCO groups bonded to an aliphatic carbon atom are dominant, the content may be ≤3000 ppm, based on the total weight of the build material.

There are preferably unblocked NCO groups in the build material.

NCO-reactive compounds having Zerewitinoff-active hydrogen atoms that are used may be any compounds known to those skilled in the art and having an average OH or NH functionality of at least 1.5. These may be, for example, low molecular weight diols (for example ethane-1,2-diol, propane-1,3- or -1,2-diol, butane-1,4-diol, pentane-1,5-diol, hexane-1,6-diol), triols (for example glycerol, trimethylolpropane) and tetraols (for example pentaerythritol), short-chain amino alcohols, polyamines, but also higher molecular weight polyhydroxyl compounds such as polyether polyols, polyester polyols, polycarbonate polyols, polysiloxane polyols, polyamines and polyether polyamines, and also polybutadiene polyols.

A further preferred embodiment provides that as the cyclic tin compound one or more of the following compounds is employed:

4,12-di-n-butyl-1,7,9,15-tetraoxa-4,12-diaza-8-stannaspiro[7.7]pentadecane, 4,12-di-n-butyl-2,6,10,14-tetramethyl-1,7,9,15-tetraoxa-4,12-diaza-8-stannaspiro[7.7]pentadecane, 2,4,6,10,12,14-hexamethyl-1,7,9,15-tetraoxa-4,12-diaza-8-stannaspiro[7.7]pentadecane, 4,12-di-n-octyl-2,6,10,14-tetramethyl-1,7,9,15-tetraoxa-4,12-diaza-8-stannaspiro[7.7]pentadecane, 4,12-di-n-octyl-1,7,9,15-tetraoxa-4,12-diaza-8-stannaspiro[7.7]pentadecane, 4,12-dimethyl-1,7,9,15-tetraoxa-4,12-diaza-8-stannaspiro[7.7]pentadecane, 1,1-dichloro-5-methyl-5-aza-2,8-dioxa-1-stannacyclooctane, 1,1-diisopropyl-5-methyl-5-aza-2,8-dioxa-1-stannacyclooctane, 1,1-dibenzoyl-3,3,7,7-tetramethyl 5-n-octyl-5-aza-2,8-dioxa-1-stannacyclooctane, 1,1-dibenzoyl-5-n-octyl-5-aza-2,8-dioxa-1-stannacyclooctane, 1,1-bis(p-dodecylphenylsulfonyl)-5-n-octyl-5-aza-2,8-dioxa-1-stannacyclooctane, 2-benzoyloxy-6-octyl-4,8-dioxo-1,3,6,2-dioxazastannocan-2-yl benzoate or mixtures thereof.

In a further preferred embodiment, the free-radically crosslinkable build material contains groups having Zerewitinoff-active hydrogen atoms and in that the blocking agent is an isocyanate or the blocking agent is selected such that, after deblocking of the NCO group, no release of the blocking agent as a free molecule or as part of other molecules or molecular moieties takes place. In that case, the after the deblocking, the functional groups obtained can react with compounds having at least two Zerewitinoff-active hydrogen atoms, such that an increase in mechanical strength or crosslinking occurs. In this respect, deblocking of the NCO groups in the context of the present invention need not necessarily mean that an NCO group is obtained again. Instead, this may also mean that a functional group such as an acyl cation group can be obtained after deblocking, which reacts with other functional groups having Zerewitinoff-active hydrogen atoms to form a covalent bond.

The reaction is preferably performed until ≤50%, preferably ≤30% and more preferably ≤20% of the blocked isocyanate groups originally present in the curable component are still present. This can be determined by surface IR spectroscopy. It is further preferable that, after step IV), ≥50%, ≥60%, ≥70% or ≥80% of the NCO groups deblocked in the curable component react with the compound having at least two Zerewitinoff-active hydrogen atoms.

Here too, NCO-reactive compounds having Zerewitinoff-active hydrogen atoms that are used may be any compounds known to those skilled in the art and having an average OH or NH functionality of at least 1.5. These may be, for example, low molecular weight diols (for example ethane-1,2-diol, propane-1,3- or -1,2-diol, butane-1,4-diol, pentane-1,5-diol, hexane-1,6-diol), triols (for example glycerol, trimethylolpropane) and tetraols (for example pentaerythritol), short-chain amino alcohols, polyamines, but also higher molecular weight polyhydroxyl compounds such as polyether polyols, polyester polyols, polycarbonate polyols, polysiloxane polyols, polyamines and polyether polyamines, and also polybutadiene polyols.

In a preferred embodiment, the blocking agent is selected from the group consisting of organic isocyanates, lactams, glycerol carbonate, a compound of the general formula (I):

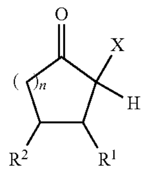

(I)

in which X is an electron-withdrawing group, $R^1$ and $R^2$ are independently the radicals H, $C_1$-$C_{20}$-(cyclo)alkyl, $C_6$-$C_{24}$-aryl, $C_1$-$C_{20}$-(cyclo)alkyl ester or amide, $C_6$-$C_{24}$-aryl ester or amide, mixed aliphatic/aromatic radicals having 1 to 24 carbon atoms which may also be part of a 4- to 8-membered ring and n is an integer from 0 to 5, or a combination of at least two of these.

The electron-withdrawing group X may be selected from any substituents which result in CH acidity of the α-hydrogen. These may include, for example, ester groups, amide groups, sulfoxide groups, sulfone groups, nitro groups, phosphonate groups, nitrile groups, isonitrile groups, polyhaloalkyl groups, halogens such as fluorine, chlorine or carbonyl groups. Preference is given to nitrile and ester groups, particular preference being given to methyl carboxylate and ethyl carboxylate groups. Also suitable are compounds of the general formula (I) wherein the ring optionally contains heteroatoms, such as oxygen, sulfur or nitrogen atoms. The activated cyclic ketone of formula (I) preferably has a ring size of 5 (n=1) and 6 (n=2).

Preferred compounds of general formula (I) are cyclopentanone 2-carboxymethyl ester and -carboxyethyl ester, cyclopentanone-2-carbonitrile, cyclohexanone 2-carboxymethyl ester and -carboxyethyl ester or cyclopentanone-2-carbonylmethyl. Particular preference is given to cyclopentanone 2-carboxymethyl ester and -carboxyethylester and cyclohexanone 2-carboxymethyl ester and -carboxyethyl ester. The cyclopentanone systems are easily obtainable industrially by a Dieckmann condensation of dimethyl adipate or diethyl adipate. Cyclohexanone 2-carboxymethyl ester can be prepared by hydrogenation of methyl salicylate.

Further preferred blocking agents are glycerol carbonate, lactams such as ε-caprolactam or isocyanates themselves. The NCO group to be blocked can react with the NCO group of the blocking agent to form a uretdione. The reverse reaction results in reformation of the NCO groups which react with the available chain extenders. It is particularly preferable when the blocking agent and the compound having the NCO group to be blocked are identical. In that case, blocking comprises a dimerization of the relevant compound. This and the reaction with polyol and polyamine are shown by way of example in the scheme which follows.

In a further preferred embodiment, step II) simultaneously illuminates and/or irradiates a multitude of energy beams the selected area of the layer of the free-radically crosslinkable build material corresponding to the respectively selected cross section of the precursor. Accordingly, this embodiment covers the additive manufacturing method of DLP technology when the multitude of energy beams generates the image to be provided by exposure and/or irradiation via an array of individually controllable micromirrors.

In a further preferred embodiment, in step II), the deposited layers of the free-radically crosslinked build material are heated to a temperature above the melting point of the free-radically crosslinkable polyurethane. The temperature may be ≥10° C. to ≤100° C., preferably ≥20° C. to ≤80° C. and more preferably ≥30° C. to ≤60° C. above the melting point of the free-radically crosslinkable polyurethane ascertained by DSC. In this way, the third subsequent curing mechanisms in particular as described above can proceed faster and/or more comprehensively.

In a preferred embodiment of the method of the invention, in step IV), the performing of the chemical reaction includes heating to a temperature above the melting point of the free-radically crosslinkable polyurethane. Preferably, the performing of the chemical reaction is performed with heating above room temperature RT of 23° C., preferably at a temperature within a range from 50 to 200° C., or preferably within a range from 60 to 180° C., or preferably within a range from 80 to 150° C.

The present invention further provides a system for producing an article in an additive manufacturing method from a precursor, comprising a carrier that can be raised counter to the direction of gravity, a build unit comprising a molten build material below the carrier and an irradiation and/or exposure unit for irradiating and/or exposing molten build material below the carrier, wherein the build material comprises a thermoplastic free-radically crosslinkable polyurethane and a photoinitiator.

In a preferred embodiment, the free-radically crosslinkable polyurethane has in the system has a melting point of ≥50° C. (DSC; preferably ≥60° C. to ≤240° C., more preferably ≥80° C. to ≤180° C.);

the free-radically crosslinkable polyurethane has a viscosity (DIN EN ISO 2884-1) at the processing temperature of ≤10 000 mPas (preferably ≥50 mPas to ≤8000 mPas, more preferably ≥500 mPas to ≤5000 mPas);

the photoinitiator has a half-life for its thermal degradation at the processing temperature of ≥1 hour, or preferably ≥1.5 hours to ≤5 hours, more preferably ≥2 hours to ≤4 hours; and/or there are further functional groups in blocked or unblocked form other than free-radically crosslinkable functional groups in the free-radically crosslinkable build material, and these are capable of entering into a reaction other than free-radical crosslinking for increasing mechanical strength in the build material. For details with regard to these functional groups and their reactions, to avoid repetition, reference is made to the above remarks relating to the method of the invention.

The present invention further relates to the use of a free-radically crosslinkable build material in an additive manufacturing method at a processing temperature of ≥50° C., wherein the free-radically crosslinkable build material comprises a thermoplastic free-radically crosslinkable polyurethane having a urethane group content of ≥5% by weight and a photoinitiator. For details with regard to the build material including preferred variants and ranges, to avoid repetition, reference is made to the above remarks relating to the method of the invention.

The present invention likewise relates to a polymer obtainable from the free-radical crosslinking of a thermoplastic free-radically crosslinkable polyurethane having a urethane group content of ≥5% by weight, where the free-radically crosslinkable polyurethane is heated to a processing temperature greater than the melting point of the free-radically crosslinkable polyurethane and where there are further functional groups in blocked or unblocked form other than free-radically crosslinkable functional groups in the free-radically crosslinkable polyurethane, and these enter into a crosslinking reaction other than free-radical crosslinking in the build material. For details with regard to the build material including preferred variants and ranges, to avoid repetition, reference is made to the above remarks relating to the method of the invention.

The present invention finally relates to a coating comprising a polymer of the invention. The coating is preferably a paint or an adhesive.

Figure 2:
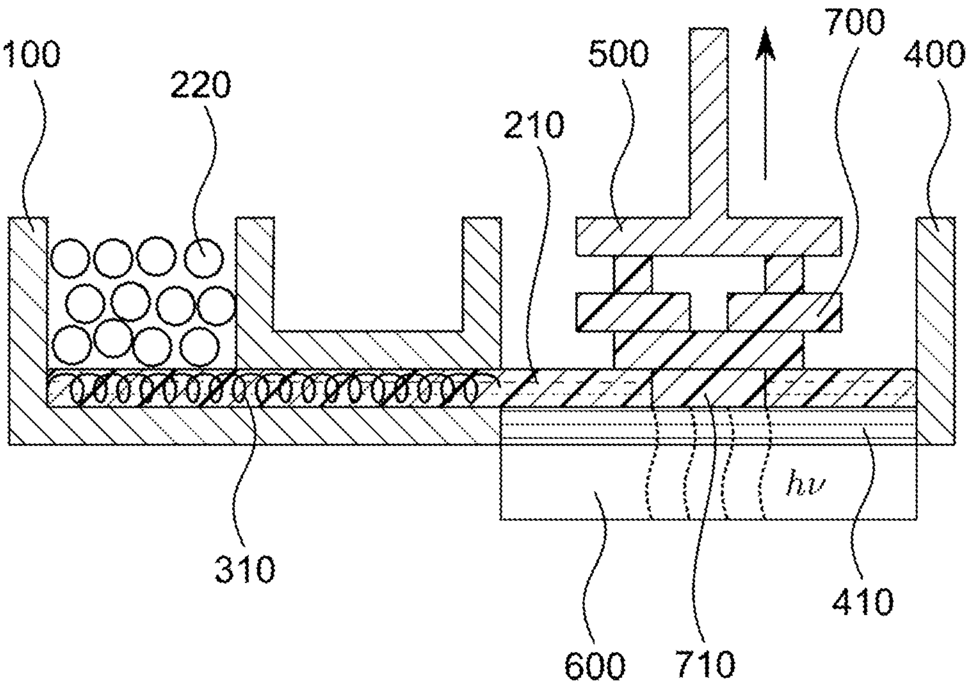
FIG. 2 depicts a further system of the invention in the performance of the method of the invention.

The present invention is more particularly elucidated by the figures that follow, without being limited thereto. The drawings show:

FIG. 1 a system of the invention in the performance of the method of the invention, FIG. 2 a further system of the invention in the performance of the method of the invention.

In the system shown in FIG. 1, a reservoir vessel 100 provides a molten build material 200. The reservoir vessel 100 is appropriately thermally insulated and/or has a controlled heating device in order to heat the molten build material 200 to a predetermined temperature. By means of a pump 300, the molten build material 200 reaches the build unit 400. The molten build material is present there in the form of a layer 210, the thickness of which correlates with the thickness of a layer of the precursor 700 to be built up layer by layer. It is likewise preferable that the build unit 400 is thermally insulated and/or has a controlled heating device in order that the layer 210 remains in the molten state. The base of the build unit 400 is formed by a transparent base 410 manufactured from quartz glass, for example. By means of a carrier 500, the precursor 700 to be built up, which is bonded thereto, is moved counter to the direction of gravity, symbolized in FIG. 1 by the arrow pointing upward. An exposure unit 600 exposes the layer 210 of the molten build material in accordance with the respective cross section of the precursor to be built up. This is symbolized in FIG. 1 by "hv".

The action of light results in free-radical crosslinking of the molten build material in a predetermined region of the layer 210 with deposition of a layer 710 onto a previously deposited layer of the free-radically crosslinked build material. Subsequently, the carrier 500 is raised by a predetermined distance and the layer 210 is completed by means of the pump 300. In this way, the precursor 700 to be built up is obtained from individual layers. Since already formed parts of the precursor 700 are no longer being heated, the temperature thereof falls, and solidification results in further mechanical consolidation. FIG. 1 does not show how the precursor 700 is optionally subjected to thermal aftertreatment, resulting in further consolidation.

In the system shown in FIG. 2, a reservoir vessel 100 provides a build material 220 in pellet form. The reservoir vessel 100 may be thermally insulated and/or have a controlled heating device in order to heat the build material 220 to a predetermined temperature. By means of a heatable extruder screw 310, the build material molten thereby reaches the build unit 400. The molten build material is present there in the form of a layer 210, the thickness of which correlates with the thickness of a layer of the precursor 700 to be built up layer by layer. It is preferable that the build unit 400 is thermally insulated and/or has a controlled heating device in order that the layer 210 remains in the molten state. The base of the build unit 400 is formed by a transparent base 410 manufactured from quartz glass, for example. By means of a carrier 500, the precursor 700 to be built up, which is bonded thereto, is moved counter to the direction of gravity, symbolized in FIG. 2 by the arrow pointing upward. An exposure unit 600 exposes the layer 210 of the molten build material in accordance with the respective cross section of the precursor to be built up. This is symbolized in FIG. 1 by "hv".

The action of light results in free-radical crosslinking of the molten build material in a predetermined region of the layer 210 with deposition of a layer 710 onto a previously deposited layer of the free-radically crosslinked build material. Subsequently, the carrier 500 is raised by a predetermined distance and the layer 210 is completed by means of the pump 300. In this way, the precursor 700 to be built up is obtained from individual layers. Since already formed parts of the precursor 700 are no longer being heated, the temperature thereof falls, and solidification results in further mechanical consolidation. FIG. 2 does not show how the precursor 700 is optionally subjected to thermal aftertreatment, resulting in further consolidation.

EXAMPLES

General Details

All percentages, unless stated otherwise, are based on percent by weight (% by weight).

The ambient temperature of 23° C. at the time of conducting the experiments is referred to as RT (room temperature). When reference is made hereinafter to heating, this means that the build material is brought to a temperature above RT.

The methods detailed hereinafter for determining the relevant parameters were employed for performing/evaluating the examples and are also the methods for determining the parameters relevant in accordance with the invention in general.

Determination of Phase Transitions by DSC

The phase transitions were determined by means of DSC (differential scanning calorimetry) with a Mettler DSC 12E (Mettler Toledo GmbH, Giessen, Germany) in accordance with DIN EN 61006. Calibration was effected via the melt onset temperature of indium and lead. 10 mg of substance were weighed out in standard capsules. The measurement was effected by two heating runs from −50° C. to +150° C. at a heating rate of 20 K/min with subsequent cooling at a cooling rate of 320 K/min. Cooling was effected by means of liquid nitrogen. The purge gas used was nitrogen. The values reported are each based on the evaluation of the 1st heating curve, since changes in the sample in the measurement process at high temperatures are possible in the reactive systems being examined as a result of the thermal stress in the DSC. The melting temperatures $T_m$ were obtained from the temperatures at the maxima of the heat flow curves. The glass transition temperature $T_g$ was ascertained from the temperature at half the height of a glass transition step.

Determination of Infrared Spectra

The infrared spectra were measured on a Bruker FT-IR spectrometer equipped with an ATR unit. For the relative measurement of the change in the free NCO groups on films, a Bruker FT-IR spectrometer (Tensor II) was used. The sample was contacted with the platinum ATR unit. The contacted area of the sample was 2×2 mm. In the course of measurement, the IR radiation penetrated 3-4 μm into the sample according to wavenumber. An absorption spectrum was then obtained from the sample. In order to compensate for nonuniform contacting of the samples of different hardness, a baseline correction and a normalization in the wavenumber range of 2600-3200 (CH2, CH3) was performed on all spectra. The interpolation of the "free" NCO group was performed in the wavenumber range of 2170-2380.

Determination of Viscosity

All viscosity measurements were made with a Physica MCR 51 rheometer from Anton Paar Germany GmbH (Germany) to DIN EN ISO 3219.

Determination of Modulus of Elasticity

The modulus of elasticity was ascertained on cured polymer films in a tensile test to DIN 53371.

Determination of Hardness

Microhardness was determined by means of a Fischerscope H100C instrument, and Martens hardness was calculated by means of DIN EN ISO 14577-1b using the force-indentation curve.

Determination of Pot Life

Pot life was determined as the time until doubling of the viscosity at processing temperature.

Determination of the Half-Life of the Photoinitiator

The half-life of the photoinitiator at processing temperature was determined as a 10% solution in d8-toluene at processing temperature. Degradation was determined using initiator-specific signals of the product spectrum by means of 1H or 13C NMR spectroscopy.

Starting Compounds

- Polyisocyanate A: HDI trimer (NCO functionality >3) with an NCO content of 23.0% by weight by test method M105-ISO 11909, sourced from Covestro AG as Desmodur® N3600. The viscosity is about 1200 mPa·s at 23° C. (DIN EN ISO 3219/A.3).
- Polyisocyanate B: HDI uretdione (NCO functionality >2) with an NCO content of 21.8% by weight by test method M105-ISO 11909, sourced from Covestro AG as Desmodur® N3400. The viscosity is about 175 mPa·s at 23° C. (DIN EN ISO 3219/A.3).
- Isophorone diisocyanate (IPDI), functionality: 2, sourced from Covestro AG as Desmodur® I.
- Hexamethylene diisocyanate (HDI), functionality: 2, sourced from Covestro AG as Desmodur® H.
- Hydroxyethyl methacrylate (HEMA), sourced from Sigma Aldrich.
- Polytetrahydrofuran having a number-average molecular weight of about 1000 g/mol (PolyTHF1000), sourced from Sigma Aldrich.
- Ebecryl® 4101, urethane acrylate, viscosity at 25° C. about 7000 mPas, number-average molecular weight about 1100 g/mol, functionality about 3, sourced from Allnex.
- Ebecryl® 4141, urethane acrylate, viscosity at 25° C. about 10 000 mPas, number-average molecular weight about 700 g/mol, functionality about 2, NCO content about 12%, sourced from Allnex.
- Butylhydroxytoluene (BHT), sourced from Sigma Aldrich.
- 2-(2-Dimethylaminoethoxy)ethanol, with an OH number of about 421 mg KOH/g, sourced from Huntsman Corporation as Jeffcat® ZR-70.
- Dibutyltin dilaurate (DBTL) sourced from TIB Chemicals as TIB KAT 218.
- 2-Hydroxy-2-methylpropiophenone photoinitiator, sourced from IGM Resins as Omnirad® 1173.

Preparation of the Trimerization Catalyst K Used:

2-(2-Dimethylaminoethoxy)ethanol having an OH number of 421 mg KOH/g was reacted with an equimolar amount of isocyanate, based on OH number, of polyisocyanate A (about 23% by weight of isocyanate) by dropwise addition with stirring and cooling at room temperature until no OH was detectable any longer and the isocyanate concentration after titration was <0.5%.

Preparation of the Noninventive Urethane Acrylate C1

To 58.26 g of the oligomeric starting polyisocyanate A1 at room temperature was added, while stirring, 41.67 g of hydroxyethyl methacrylate, as were 0.05 g of BHT and 0.02 g of DBTL, followed by heating to 50° C. for 3 h and then stirring until the isocyanate concentration was <0.5%. Cooling to room temperature and stirring for a further 5 h gave a clear, highly viscous urethane acrylate having a viscosity of 1250 mPas at 75° C.

Preparation of the Inventive Urethane Acrylate C2*

To 59.75 g of the oligomeric starting polyisocyanate B at room temperature was added, while stirring, 40.18 g of hydroxyethyl methacrylate, as were 0.05 g of BHT and 0.02 g of DBTL, followed by heating to 50° C. for 3 h and then stirring until the isocyanate concentration was <0.5%. Cooling to room temperature gave a urethane acrylate that was solid at 23° C. and had a viscosity of 330 mPas at 75° C. Urethane content: about 18%.

Preparation of the Inventive Urethane Acrylate C3*

To 39.2 g of HDI at room temperature is added, while stirring, 60.74 g of hydroxyethyl methacrylate, as are 0.05 g of BHT and 0.02 g of DBTL, followed by heating to 50° C. for 3 h and then stirring until the isocyanate concentration is <0.5%. Cooling to room temperature gives a urethane acrylate that is solid at 23° C. and has a viscosity of 63 mPas at 75° C. Urethane content: about 27%.

Production of the Formulations

The free-radically curable build materials according to examples 1 to 6, as listed in the table below, were weighed out in a glass vessel and brought to a temperature of 75° C. and homogenized while stirring at 75° C. Thereafter, the free-radically curable build materials according to examples 1 to 8 were drawn down onto a glass plate preheated to 80° C. with a coating bar having a 400 μm gap.

The coated glass substrates were then cured at a resin temperature of about 75° C. in a Superfici UV curing system with mercury and gallium radiation sources at a belt speed of 2.5 m/min. The lamp power and belt speed result in a radiation intensity of 2600 $mJ/cm^2$ that acted on the coatings in the form of the film.

Subsequently, the UV-cured films of examples 6 to 8 on the glass substrates were stored in a drying oven at 130° C. under an air atmosphere for 1 hour.

The formulations of examples 1 to 6 and the results of tests on these and the resulting cured films are listed in tables 1 and 2.

Inventive examples are identified by an *.

TABLE 1

| | Example | | | |
|---|---|---|---|---|
| | 1 | 2 | 3* | 4* |
| Feedstocks | Weight [g] | | | |
| Ebecryl 4101 | 10 | | | |
| C1 | | 10 | | |
| C2* | | | 10 | |
| C3* | | | | 10 |
| Omnirad 1173 | 0.3 | 0.3 | 0.3 | 0.3 |
| Results of the tests on the formulations | | | | |
| Assessment at room temperature | liquid | liquid | solid | solid |
| Viscosity at processing temperature of 75° C. [mPas] | 250 | 1250 | 330 | 63 |
| $T_g$ first heating [° C.] | −43.5 | −16.5 | −29 | −2.2 |
| $T_m$ first heating [° C.] | — | — | 52.5 | 73.7 |

TABLE 1-continued

| Feedstocks | Example 1 | 2 | 3* | 4* |
|---|---|---|---|---|
| | Weight [g] | | | |
| Results of the tests on the UV-cured formulations | | | | |
| Assessment of film | solid clear film | solid clear film | solid clear film | solid clear film |
| Martens hardness [N/mm$^2$] | 5.95 | 97.67 | 86.91 | 186.13 |
| Modulus of elasticity (tensile test) [MPa] | 38 | 2060 | 1790 | 2680 |
| $T_g$ first heating [° C.] | 1.5 | 122 | 109 | 123 |

TABLE 2

| Feedstocks | Example 5* | 6* |
|---|---|---|
| | Weight [g] | |
| C2* | 8 | |
| C3* | | 7 |
| Ebecryl ® 4141 | | 3 |
| PolyTHF1000 | 2 | |
| Trimerization catalyst K | | 0.1 |
| DBTL | 0.002 | |
| Omnirad ® 1173 | 0.3 | 0.3 |
| Results of the tests on the formulations | | |
| Pot life [h] | >1 | >1 |
| Shelf life >1 month under air, no visible changes | ok | ok |
| Results of the tests on the UV-cured formulations | | |
| Martens hardness (N/mm$^2$) | 64.13 | 160.92 |
| IR: NCO vibration peak ratio to CH2/CH3 peak vibration | — | 0.52 |
| Results of the tests on the UV-cured formulations after heat storage | | |
| Martens hardness (N/mm$^2$) | 73.51 | 166.5 |
| IR: NCO vibration peak ratio to CH2/CH3 peak vibration | — | 0.13 |

Inventive examples 3 to 6 containing cloudy white urethane acrylates that are solid at room temperature and have a melting point above room temperature. By comparison with noninventive examples 1 and 2, after UV curing, they feature much higher hardnesses and moduli of elasticity, based on the functionality of the isocyanates used, and softening points with simultaneously clear transparent films.

Inventive examples 5 and 6 show the successful combination of reactive compositions immiscible at room temperature by a first UV curing above the melting point of the solid urethane acrylates with subsequent heat storage of the reactive components to form additional network points and a resulting improvement in the chemical properties. Moreover, inventive examples to 6 show that it is possible, below the melting point of the urethane acrylates, to produce metastable dual-cure reactive mixtures having a shelf life of >1 month prior to use. Shelf life is understood here to mean an increase in viscosity of not more than 50%.

The use of the inventive formulations in UV-curing and thermally post-curing methods in 3D printing thus makes it possible for the first time to obtain materials proceeding from fusible dual-cure systems with high urethane content and hence high mechanical strengthening that are also storage-stable.

The invention claimed is:

1. A method of producing an article in an additive manufacturing method from a precursor, comprising:

I) depositing a first layer of a free-radically crosslinked build material corresponding to a first selected cross section of the precursor on a carrier;

II) depositing a further layer of the free-radically crosslinked build material corresponding to a further selected cross section of the precursor onto the first layer or another previously applied layer of the free-radically crosslinked build material;

III) repeating step II) until the precursor is formed;

wherein the depositing of the free-radically crosslinked build material at least in step II) comprises exposing and/or irradiating a selected region of a free-radically crosslinkable build material corresponding to the respectively selected cross section of the precursor;

wherein the carrier is disposed within a container providing the free-radically crosslinkable build material, wherein the carrier is vertically raisable counter to the direction of gravity and wherein the carrier is additionally raised by a predetermined distance prior to each step II), such that a layer of the free-radically crosslinkable build material forms below a lowermost layer of the build material as viewed in a vertical direction;

wherein the free-radically crosslinkable build material comprises a thermoplastic free-radically crosslinkable polyurethane having a urethane group content of ≥15% by weight to ≤30% by weight and a photoinitiator; and wherein the free-radically crosslinkable build material comprises an isocyanate trimerization catalyst;

wherein the free-radically crosslinkable build material is heated in step II) to a processing temperature greater than a melting point, determined by dynamic differential calorimetry, first heating, at a heating rate of 20 K/min, of the free-radically crosslinkable polyurethane;

wherein the free-radically crosslinkable polyurethane has a melting point, determined by dynamic differential calorimetry, first heating, at a heating rate of 20 K/min, of ≥50° C.; and wherein, after step III), the article is formed by allowing the precursor to cool to a temperature of about 20° C., or wherein, after step III), the article is formed by performing step IV):

IV) performing a chemical reaction in the precursor obtained after step III) to obtain the article.

2. The method as claimed in claim 1, wherein the free-radically crosslinkable build material comprises further functional groups in blocked or unblocked form other than free-radically crosslinkable functional groups that are reactive towards functional groups other than free-radically crosslinkable functional groups for increasing mechanical strength in the build material.

3. The method as claimed in claim 2, wherein the free-radically crosslinkable build material comprises a polyamine component.

4. The method as claimed in claim 2, wherein the free-radically crosslinkable build material comprises blocked or unblocked NCO groups.

5. The method as claimed in claim 4, wherein the free-radically crosslinkable build material comprises groups having Zerewitinoff-active hydrogen atoms and one or more cyclic tin compounds of the formula F-I, F-II, F-III, or a combination thereof:

(F-I)

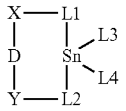

(F-II)

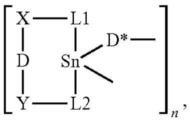

with n > 1

(F-III)

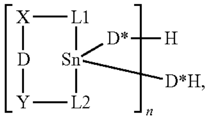

with n > 1 wherein:

D is —O—, —S— or —N(R1)— where R1 is a saturated or unsaturated, linear or branched, aliphatic or cycloaliphatic radical or an optionally substituted aromatic or araliphatic radical which has up to 20 carbon atoms and optionally comprises heteroatoms from the group of oxygen, sulfur, nitrogen, or is hydrogen or the radical

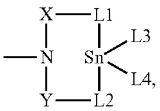

or R1 and L3 together are —Z-L5-;

D* is —O— or —S—;

X, Y and Z are identical or different radicals selected from alkylene radicals of formulae —C(R2)(R3)-, —C(R2)(R3)-C(R4)(R5)- or —C(R2)(R3)-C(R4)(R5)-C(R6)(R7)- or ortho-arylene radicals of formulae

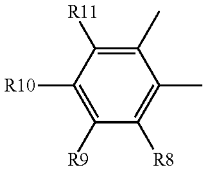

or

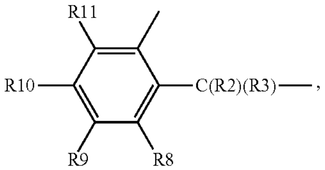

where R2 to R11 are independently saturated or unsaturated, linear or branched, aliphatic or cycloaliphatic or optionally substituted aromatic or araliphatic radicals which have up to 20 carbon atoms and optionally comprise heteroatoms from the group of oxygen, sulfur, nitrogen, or are hydrogen;

L1, L2 and L5 are independently —O—, —S—, —OC(=O)—, —OC(=S)—, —SC(=O)—, —SC(=S)—, —OS(=O)$_2$O—, —OS(=O)$_2$— or —N(R12)-, where R12 is a saturated or unsaturated, linear or branched, aliphatic or cycloaliphatic radical or an optionally substituted aromatic or araliphatic radical which has up to 20 carbon atoms and optionally comprises heteroatoms from the group of oxygen, sulfur, nitrogen, or is hydrogen;

L3 and L4 are independently —OH, —SH, —OR13, a halogen, —OC(=O)R14, —SR15, —OC(=S)R16, —OS(=O)$_2$OR17, —OS(=O)$_2$R18 or —NR19R20, or L3 and L4 together represent -L1-X-D-Y-L2-, where R13 to R20 are independently saturated or unsaturated, linear or branched, aliphatic or cycloaliphatic or optionally substituted aromatic or araliphatic radicals which have up to 20 carbon atoms and optionally comprise heteroatoms from the group of oxygen, sulfur, nitrogen, or are hydrogen.

6. The method as claimed in claim 4, wherein the free-radically crosslinkable build material contains groups having Zerewitinoff-active hydrogen atoms and further comprising a blocking agent wherein the blocking agent is an isocyanate or the blocking agent is selected such that, after deblocking of the NCO group, no release of the blocking agent as a free molecule or as part of other molecules or molecular moieties takes place.

7. The method as claimed in claim 1, wherein, in step II), a multitude of energy beams simultaneously exposes and/or irradiates the selected region of the additional layer of the free-radically crosslinkable build material corresponding to the respectively selected cross section of the precursor.

8. The method as claimed in claim 1, wherein, in step IV), the performing of the chemical reaction includes heating to a temperature above the melting point of the free-radically crosslinkable polyurethane.

9. The method as claimed in claim 1, wherein the free-radically crosslinkable polyurethane at the processing temperature has a viscosity of ≤10,000 mPas based on DIN EN ISO 2884-1.

10. The method as claimed in claim 1, wherein the photoinitiator at the processing temperature has a half-life for its thermal degradation of ≥1 hour.

11. The method as claimed in claim 1, wherein the isocyanate trimerization catalyst is contained in the free-radically crosslinkable build material to increase a Martens hardness value of the free-radically crosslinked build material.

* * * * *